May 28, 1957  F. H. GOODING  2,794,168
APPARATUS FOR LOCATING VOIDS AND OTHER IMPERFECTIONS
IN INSULATED WIRES AND CABLES
Filed Aug. 26, 1953
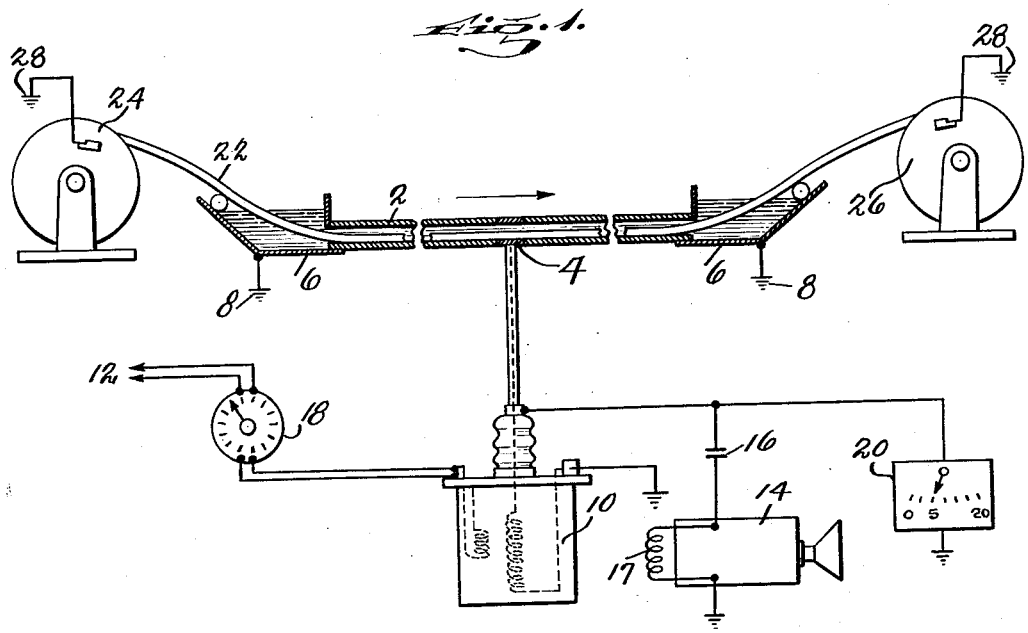
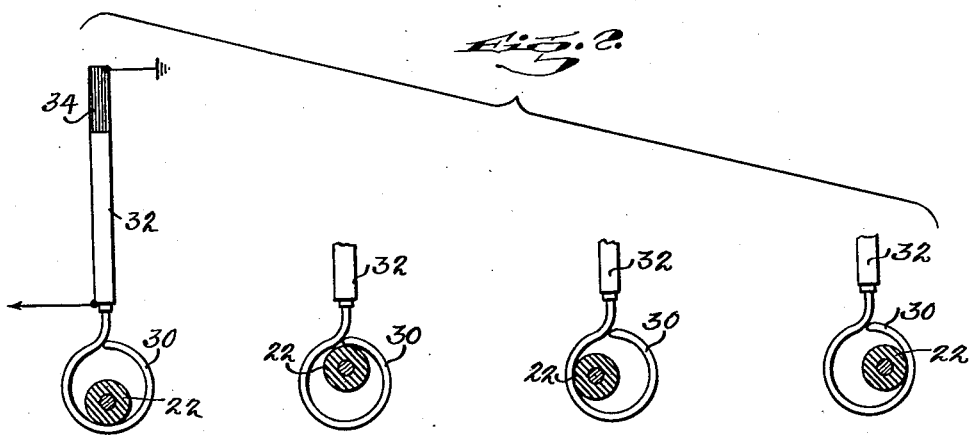
INVENTOR
Francis H. Gooding
BY
James G. Bethell
ATTORNEY

United States Patent Office 2,794,168
Patented May 28, 1957

2,794,168
APPARATUS FOR LOCATING VOIDS AND OTHER IMPERFECTIONS IN INSULATED WIRES AND CABLES

Francis H. Gooding, Lodi, N. J., assignor to The Okonite Company, Passaic, N. J., a corporation of New Jersey Application August 26, 1953, Serial No. 376,639

3 Claims. (Cl. 324—54)

The present invention relates to a method of and apparatus for locating voids and other imperfections in insulated electric wires and cables.

Prior to this invention, the practice in the cable industry has been to take samples, a few feet in length, from the ends of long lengths of insulated cable and to apply high-voltage, alternating current to the conductor while the electrostatic shield of the cable is grounded.

The applied voltage is normally insufficient to break the cable down, but should there be any void spaces in the cable dielectric or between the dielectric and the conductor or between the dielectric and the electrostatic shield, these void spaces may be ionized when the voltage is raised sufficiently high, and a high-frequency, oscillatory voltage will then appear across the sheath and cable conductor, which may be identified by connecting a suitable detector, such as a radio receiver, across the conductor and shield through a coupling condenser.

The corona voltage of the cable is measured by reading the 60-cycle voltage across the cable at the time when the first sound is heard on the radio receiver. As the 60-cycle voltage is increased, the corona noise increases very rapidly, sounding like the familiar disturbance background one may hear on radio receivers.

The disadvantage in testing in this fashion is that only the severed ends of the cable are tested, and, although these ends are considered to be representative of the whole length of cable, this assumption is obviously not justified. Tests on long lengths have convinced me that it is difficult, if not impossible, by this method to find one single void in a length of, say, 5,000 feet of cable, because the oscillatory voltage produced in the cable conductor is so small that it is almost impossible to detect.

The present invention provides a method and apparatus for testing cable continuously, that is to say, inch by inch throughout the entire length of the cable, for any defects which would lower the corona level of the cable.

In the accompanying drawings, which are more or less schematic and wherein I have illustrated an embodiment of the invention, Fig. 1 shows in part-section a layout of part of my improved apparatus; and Fig. 2 is a layout of the remaining final test equipment.

Referring to the drawings in detail, 2 designates a tube of insulating material of appreciable length—I have been employing a tube about 16 feet long—equipped at its center with a metal sleeve 4. A small tank 6, in constant communication with the tube, is attached to each end of the insulating tube, and the tanks and tube, during testing, are kept filled with a semi-conducting fluid, such as water, or other liquid having a small amount of conductivity. Each of the tanks 6 is grounded, as shown at 8.

One side of the secondary of a 60-cycle, high-voltage transformer 10, receiving its power from a 60-cycle power source 12, is connected to the conducting section or metal sleeve 4 of the insulating tube 2. The other side of the transformer secondary is grounded. 14 designates an indicating or detecting device, such as a radio receiver, connected through a high-voltage, corona-free condenser 16, to the same side of the transformer secondary as the conducting section 4 of the insulating tube 2.

In order that the charging current of the condenser 16 may be by-passed around the receiver 14, a small inductor 17 of a few millihenries is connected across the receiver terminals as illustrated. The inductance of this inductor is sufficient to present a high impedance to the high-frequency corona currents but only a low impedance to the 60-cycle power current passing through the high-voltage condenser 16. The receiver, therefore, will respond only to the high-frequency corona voltage which is generated in the cable under test when a void in the cable breaks down.

For convenience, the equipment may include voltage regulator 18 and voltmeter 20.

As above mentioned, my invention involves the continuous testing of long lengths of cable, as distinguished from testing a short piece cut from the end of a cable length, and in the drawings I show cable 22, which is drawn continuously from let-off reel 24 adjacent one end of the apparatus through the adjacent tank 6, insulated tube 2, through the tank 6 at the other end of the tube, and wound up on take-up reel 26.

As before mentioned, the tanks and insulated tube are filled with water or other semi-conducting fluid, and the cable conductor is grounded at the let-off and take-up reels, as seen at 28.

It will be appreciated that with this setup there will be a voltage gradient between the center of the tube 2 at the sleeve 4 and the ends of the tube, the voltage being highest at the center of the tube.

As the cable moves through the water or other semi-conducting fluid in the tube 2, when making the test, the voltage on the outside surface of the cable increases until the center of the tube is reached, at which point the voltage between the outside of the cable and the cable conductor is maximum. Thus it will be seen that the insulation of the wire or cable will be subjected progressively to a gradual increase in dielectric stress until the conducting section 4 of the tube 2 is reached.

As the cable is moving through the insulating tube 2, let it be assumed that there is a void in the cable to the left of the metal sleeve 4, as viewed in Fig. 1. The voltage across this void will increase as the cable continues to move forward until the sleeve 4 is reached, and if the void is of such a nature as eventually to cause failure when the wire or cable is operating at its rated voltage, the voltage across the void is sufficient to break down and ionize the void.

At this instant, a sound will be heard in the radio receiver 14, this sound increasing in intensity until the void reaches the metal sleeve at the center of the insulating tube. After the void passes the metal sleeve, the sound will decrease in intensity and finally die away entirely as the far end of the tube 2 is reached.

The cable may then be moved back and forth within the tube 2 until the maximum sound is obtained, indicating that the void at that moment is within the area bounded by the metal sleeve 4.

The cable is then withdrawn from the tube 2, after first being marked in some fashion so as to identify that portion which was within the area bounded by the metal sleeve 4, and the final accurate location of a void is then obtained by the use of the equipment illustrated in Fig. 2.

This equipment comprises a wire loop 30, which is connected to the output side of the transformer 10, and is carried by an insulating rod 32, provided with a grounded safety handle 34, so that the same can be handled without danger to the operator. This loop is slipped over the cable and moved back and forth for a short distance along the cable at the location where the void was indicated in the tube 2. When the loop is directly abreast of the void, a sound, of course, will be heard in the radio receiver 14, and the void is then located, as far as its position longitudinally of the cable is concerned, within a small fraction of an inch. The loop may then be moved vertically of the cable and from side to side whereby the position of the void with respect to the cable circumference may be determined, that is to say, whether it is on the top, at the bottom, or at the right or left side of the cable, it being appreciated that the sound in the radio receiver is loudest when the loop contacts the cable at a point nearest the void.

When checking with the wire loop, the section of cable involved is kept immersed in oil or other insulating fluid, which will not damage the cable during a few minutes' immersion. This is required to eliminate corona at the surface of the loop itself.

It will be seen from the foregoing that the present invention provides equipment for testing insulated wire and cable wherein every inch of the wire or cable is tested continuously throughout the entire length of the wire or cable, as distinguished from prior methods above referred to in which short test lengths were tested which in the past have been considered as representative of the whole length of the cable.

It will be appreciated also that, aside from this very important feature of the present invention, the equipment here presented has another advantage in that the imperfections in the cable insulation are not destroyed by the test, and a reason may usually be assigned, after examination, for the appearance of the void in that particular location.

It will be appreciated furthermore that, while the present equipment will locate voids in the insulation which would eventually cause cable failure at rated operating voltages, it will also detect voids of a lesser magnitude.

The present equipment has also been found useful in picking out small pieces of lint or metal specks which may be present in the cable insulation.

In the majority of cases, it will be practical to repair the cable at points where corona is indicated, thus forestalling failure which might take place at some future time.

If the source of high voltage employed in the test is a small transformer operating, for instance, at 20 kv. with a capacity of less than 1 kva., it may be desirable to use distilled water in the insulating tube instead of tap water. There is a steady flow of current between the high voltage electrodes in the center of the tube and the grounded tanks at each end, so that, when the water becomes contaminated with conducting materials, it has to be replaced or replenished. This is accomplished readily by simply running fresh water in at one end of the equipment and allowing it to overflow at the other end.

A further important feature of my invention is that the voltage applied to the cable is increased gradually. Otherwise, if the cable enters water at high voltage in an abrupt manner, it will be apparent that corona will be generated at the surface of the water where the cable enters.

At the outset of this description I have made some reference to shielded cable. Tests under my invention are made with unshielded cable. This is of advantage in that it is desirable to locate voids in the cable before the metal shield is applied.

It will be appreciated still further that the voltage gradient along the tube 2 provides a quantitative measure of corona level, and actually the time during which corona is present, as indicated on the detecting equipment as noise or on the oscilloscope pattern, is a measure of the voltage at which it starts, and there is an indication as to how bad the imperfection is at the same time the imperfection is located.

It is to be understood that changes may be made in the details of construction and arrangement of parts hereinabove described within the purview of my invention.

What I claim is:

1. Apparatus for detecting and locating imperfections in insulated wires and cables, said apparatus comprising, in combination, a tube of insulating material provided with a conducting section intermediate its ends, a tank at each end of said tube in constant communication with the tube, a body of semiconducting fluid in said tanks and tube, and a transformer having one side of its secondary connected to said conducting section of the tube and the other side of its secondary grounded, whereby, as an insulated wire or cable having its conductor grounded progresses through said semi-conducting fluid and said tube, the insulation of the wire or cable will be subjected to a dielectric stress which increases and will continue to increase until the conducting section of the insulating tube is reached; and an indicating device connected to the same side of the transformer secondary as the conducting section of the tube and operable, as the wire or cable being inspected progresses through the insulating tube, upon any variation in said dielectric stress caused by the sudden ionization or local breakdown of an imperfection in the insulation of the wire or cable.

2. Apparatus for detecting and locating imperfections in insulated wires and cables, said apparatus comprising, in combination, a tube of insulating material provided with a conducting section intermediate its ends, said conducting section of the tube being in the form of a metal sleeve concentric with the tube, a tank at each end of said tube in constant communication with the tube, a body of semi-conducting fluid in said tanks and tube, and a transformer having one side of its secondary connected to said conducting section of the tube and the other side of its secondary grounded, whereby, as a grounded, insulated wire or cable progresses through said semi-conducting fluid and said tube, the insulation of the wire or cable will be subjected to a dielectric stress which increases and will continue to increase until the conducting section of the insulating tube is reached; and an indicating device connected to the same side of the transformer secondary as the conducting section of the tube and operable, as the wire or cable being inspected progresses through the insulating tube, upon any variation in said dielectric stress caused by an imperfection in the insulation of the wire or cable.

3. Apparatus for detecting and locating imperfections in insulated wires and cables, said apparatus comprising, in combniation, a tube of insulating material provided with a conducting section intermediate its ends, a grounded tank at each end of said tube in constant communication with the tube, a body of semi-conducting liquid in the said tanks and tube, a high-voltage transformer having one side of its secondary connected to the said conducting section of the tube and the other side of its secondary grounded, whereby, as a grounded, insulated wire or cable progresses continuously through the semi-conducting liquid, the insulation of the wire or cable will be subjected to a dielectric stress which increases and will continue to increase until the conducting section of the insulating tube is reached; and an indicating device connected to the same side of the transformer secondary as the conducting section of the tube, for detecting the presence of radio-frequency currents caused by breakdown and ionization of a void in the insulation of the wire or cable.

References Cited in the file of this patent

UNITED STATES PATENTS

| | | |
|---|---|---|
| 2,087,783 | Savage | July 20, 1937 |
| 2,280,119 | Gorman et al. | Apr. 21, 1942 |
| 2,460,107 | Slade | Jan. 25, 1949 |
| 2,479,426 | Stewart et al. | Aug. 16, 1949 |